United States Patent [19]

Wagner et al.

[11] Patent Number: 4,484,965
[45] Date of Patent: Nov. 27, 1984

[54] PNEUMATIC TIRE AND METHOD OF MAKING SAME

[75] Inventors: William D. Wagner, Akron; Stephen C. Sabo, Barberton, both of Ohio

[73] Assignee: The B. F. Goodrich Company, Akron, Ohio

[21] Appl. No.: 529,172

[22] Filed: Sep. 2, 1983

Related U.S. Application Data

[62] Division of Ser. No. 277,566, Jun. 25, 1981, abandoned.

[51] Int. Cl.³ .................... B29H 17/20; B29H 17/26; B60C 9/20
[52] U.S. Cl. .................................. 156/117; 156/123; 156/133; 152/361 R
[58] Field of Search ..................... 156/110.1, 117, 123, 156/124, 130, 133, 134; 152/361 R, 361 DM, 361 FP

[56] References Cited

U.S. PATENT DOCUMENTS

| | | | |
|---|---|---|---|
| 3,533,898 | 10/1970 | Bezbatchenko, Jr. | 152/361 R |
| 3,550,667 | 12/1970 | Bartley et al. | 152/361 R |
| 3,720,569 | 3/1973 | Kimble | 152/361 R |
| 3,729,365 | 4/1973 | Greene | 152/361 DM |
| 4,173,503 | 11/1979 | Shipman et al. | 156/123 R |
| 4,201,260 | 5/1980 | Hirtain et al. | 152/361 DM |

Primary Examiner—Lois E. Boland
Attorney, Agent, or Firm—Philip P. McCann; Harry F. Pepper, Jr.

[57] ABSTRACT

A radial pneumatic tire and a method of making same. The tire has a discontinuous cord belt reinforcement comprising narrow strips of fabric wound around the tire in a plurality of circumferential overlapping turns. The tire is capable of being built in one stage and shaped into toroidal shape after the circumferential belt is applied.

5 Claims, 9 Drawing Figures

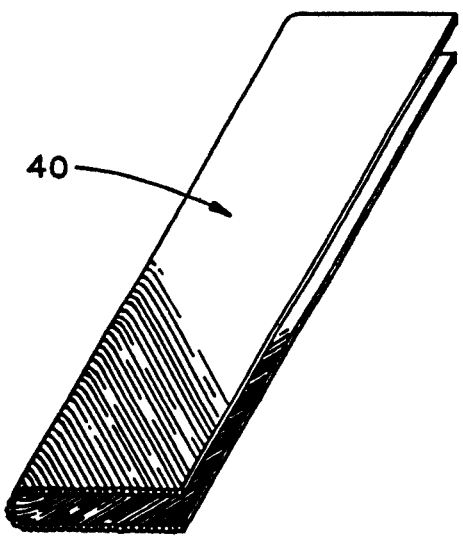
Fig. 6
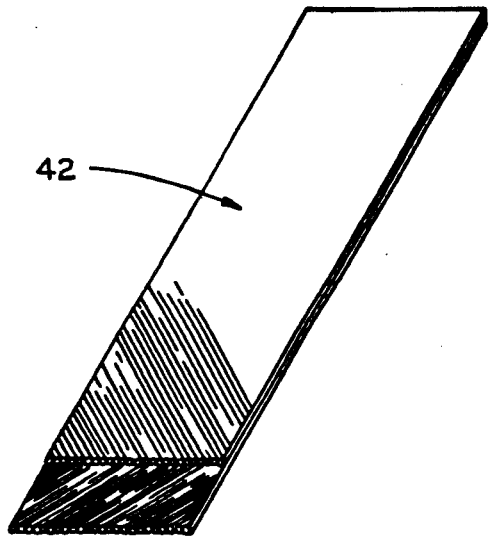
Fig. 8
Fig. 5
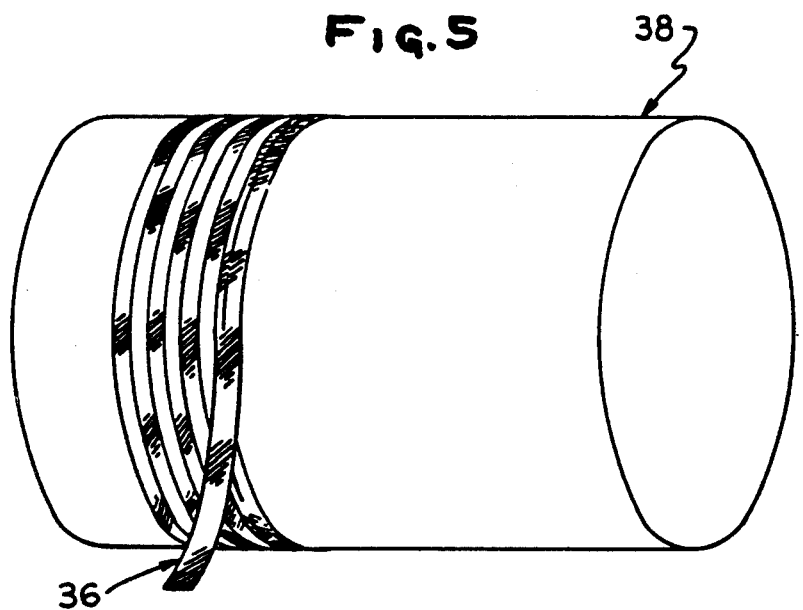

PNEUMATIC TIRE AND METHOD OF MAKING SAME

This is a division, of application Ser. No. 277,566, filed Jun. 25, 1981, now abandoned.

BACKGROUND OF THE INVENTION

Pneumatic tires of the radial type comprise one or more plies of carcass reinforcing cords which extend from bead to bead in planes that contain the axis of the tire, or make a small angle therewith, and extend in a radial direction. The crown of the tire is provided with one or more belt plies, the cords of which extend at small bias angles relative to the circumferential center line of the tire. The large difference of angularity between the carcass reinforcing cords and the cords of the belt plies has generally required that these components be applied in two separate stages. Thus, the carcass ply or plies are assembled with bead cores in a first stage upon a generally cylindrical tire building drum after which the carcass is removed from the drum. In the second stage the cylindrical carcass is shaped to a generally toroidal configuration upon which the belt plies are applied, followed by the rubber which is to form the tread of the completed tire.

Efforts have been made heretofore to assemble radial tires completely in one stage upon a cylindrical tire building drum by providing a lubricant between those components of the tire which partake of the largest movements relative to each other during the shaping operation. Such lubricants have generally been provided in powdered or liquid form to select areas of the components during the tire building or assembling operation with other areas remaining untreated so that the assembled materials will adhere sufficiently for handling, while permitting the required relative movement during shaping. In such prior operations it has been difficult to properly control the application of the lubricant. This has resulted in high percentages of defective product as well as loss of time in cleaning the tire building apparatus to remove excess lubricant. Another method that has been used heretofor to produce radial tires in a single building process is described in U.S. Pat. No. 3,486,546. The method described in U.S. Pat. No. 3,486,546 is to use a material commonly referred to as "stretch cord" for the belt. The circumferentially extending belt is made from a plurality of plies of low bias angle which have initially a low tensile modulus until stretched a predetermined and limited amount and then abruptly change to a much higher modulus so that they become substantially inextensible. These cords of predetermined stretchability comprise textile yarns helically wrapped around a prevulcanized continuous core of elastomeric material with the size of the core and wrapping as well as the helical pitch of the latter so chosen that the cords become substantially inextensible after elongating in the range of 40–45% of their initial length.

Although the above two methods have been used heretofore, they both have disadvantages in that they result in high scrap tire rates and excess raw material waste. Nevertheless, there has been a continuing need for achieving one stage building of radial tires in order to reduce labor costs, increase output of existing equipment, and eliminate the need for specialized additional equipment required when two-stage building of the tire is employed.

SUMMARY OF THE INVENTION

It is an object of the present invention to provide an improved pneumatic tire having a carcass of radial extending cord reinforcement and a belt having cords which extend at small bias angles relative to the circumferential center line of the tire.

It is a further object to provide an improved method for building a radial pneumatic tire in one stage.

These and other objects, which will be evident from the remaining description, are achieved by a radial pneumatic tire with a discontinuous cord belt comprising a narrow strip, or strips, of rubberized fabric wound around the tire in a plurality of circumferential turns in which, preferably, said strip in one turn is in overlapping relationship with a preceding turn. The cords in said strip extend at small bias angles relative to the circumferential center line of the tire. Said strips have a width of from about 15% to about 30% of the cured tire total width.

BRIEF DESCRIPTION OF THE DRAWINGS

The invention according to a presently preferred embodiment is shown in the accompanying drawings in which:

FIG. 5 is a diagrammatic front elevation view of a partially built tire on a tire building drum with the long strips of FIG. 4 being applied in overlapping fashion to form the tire belt.

FIG. 6 is a perspective view of a narrow strip of belt reinforcement fabric formed by folding a wider strip.

FIG. 8 is a perspective view of a narrow strip of belt reinforcement fabric formed by plying together two narrow strips which have opposite cord angles.

DETAILED DESCRIPTION

Figure 1:
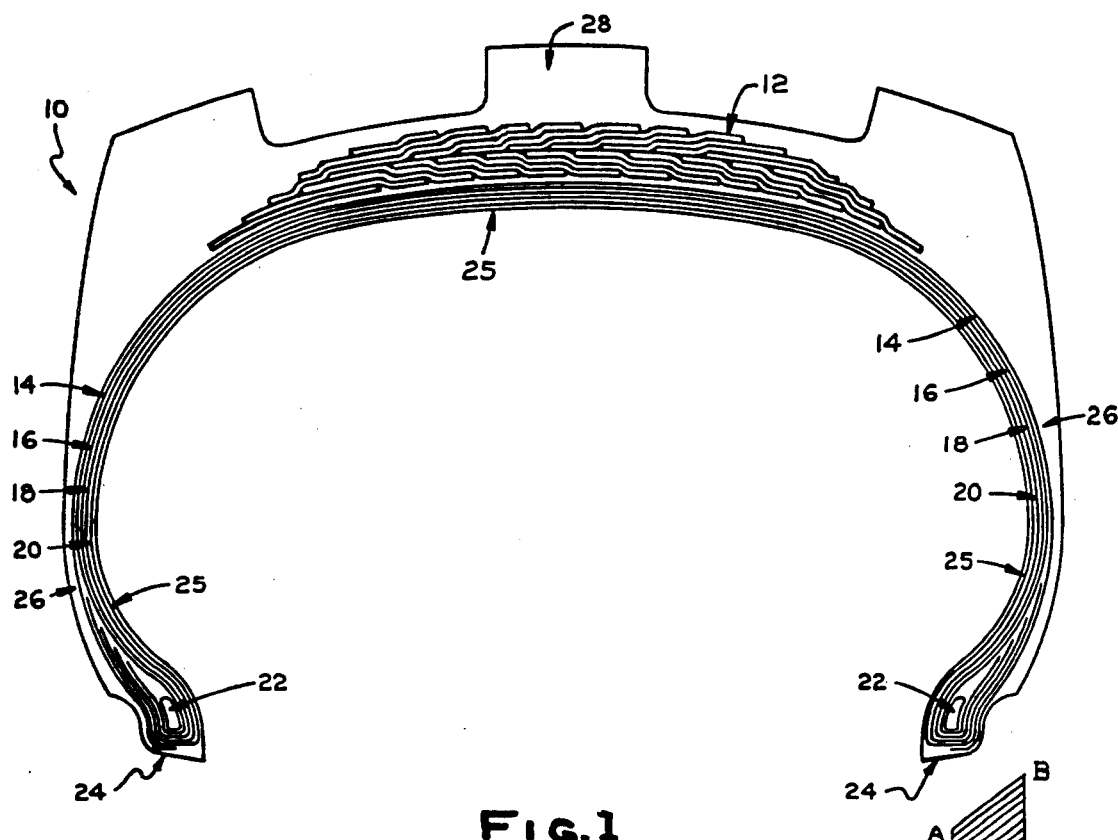
FIG. 1 is a cross-sectional view of a shaped and vulcanized radial pneumatic tire having a discontinuous cord belt of this invention.

The invention can be further described in terms of presently preferred embodiments and with reference to the several figures wherein like reference characters refer to like features or components. The invention provides a tire and a method by which radial type pneumatic tires may be built in one stage upon a cylindrical tire building drum.

The invention is illustrated by using examples and drawings of a radial farm service tire. Although this invention is very well suited to farm tires, it is also adaptable to other types and sizes of tires. The more preferred use of this invention is with large tires such as truck, farm and off-the-road tires.

In FIG. 1 there is shown a cross-sectional view of a shaped and vulcanized pneumatic radial farm tire 10 of this invention. Tire 10 has four plies of carcass cords 14, 16, 18 and 20, which may be rayon, nylon, polyester, or other suitable material, which lie with the individual rubberized cords essentially in radial planes. The edges of the plies are suitably wrapped around inextensible bead grommets 22 forming part of molded beads 24 shaped for engagement with a standard rim.

On the inner face of the tire is a layer 25 composed of a rubber material suitable as a protective layer for the carcass cords, and extending from one bead 24 to the other bead. If a tubeless tire were desired, the layer 25 would be an inner liner composed of a rubber material having resistance to diffusion of air. If an air impervious liner is not used, then an innertube is relied upon for air retention.

A protective layer of rubber completely surrounds the tire. This is preferably composed of a moderate thickness of sidewall rubber 26 in the zones where flexing occurs, and a thick layer of tread rubber 28. The tread layer has a suitable pattern of raised lugs to provide traction.

In accordance with this invention, the improved tire has, in addition to the features just described which were known before this invention, a circumferential discontinuous cord belt 12. Said belt 12 comprises a plurality of narrow strips of rubberized fabric. Low-extensible materials such as rayon, nylon, fiberglass, steel and aromatic polyamide, are preferred for use as the cords in said strips. The narrow strips are in overlapping relationship and the cords in said strips are at an angle to the circumferential central plane of the tire. This angle in the finished tire may be from about 10° to about 30° relative to the circumferential central plane. The cord angle of the radial innermost strips is equal to but opposite the cord angle of the radial outermost strips. The strips form an essentially inextensible belt around the radial cord carcass plies.

Figure 2:
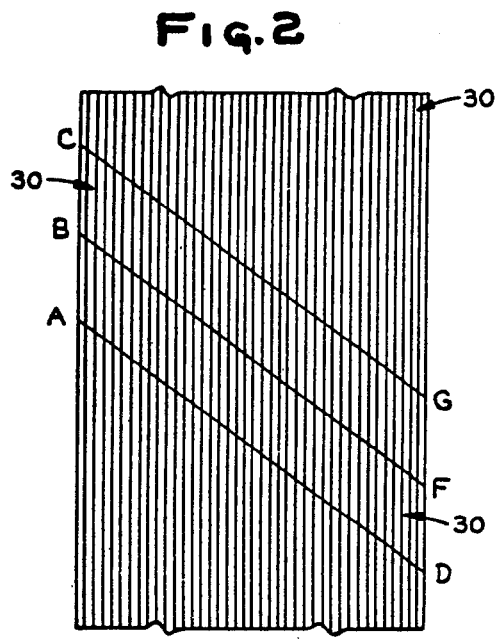
FIG. 2 is a plan view showing a calendered sheet of belt reinforcement fabric cut into strips.
Figure 3:
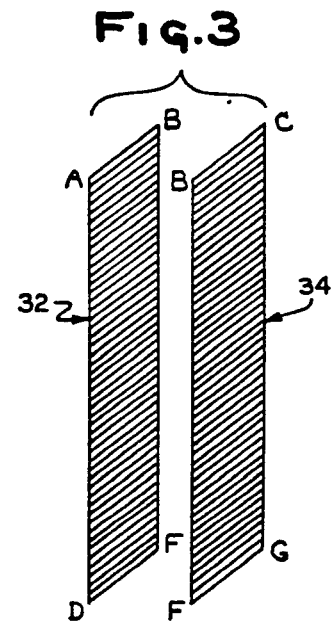
FIG. 3 is a plan view showing the strips of belt reinforcement fabric after being cut from the calendered sheet of FIG. 2.
Figure 4:
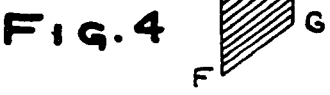
FIG. 4 is a plan view showing the belt reinforcement strips spliced together to make a long narrow strip.

The belt 12 used in tire 10 of FIG. 1 is prepared as shown in FIGS. 2, 3, 4, and 5. Referring to FIG. 2, a calendered sheet of suitable fabric comprising parallel reinforcement cords 30 wherein each cord is surrounded by a rubber compound, is bias cut into strips of suitable width. The width to which the fabric is cut is critical to the making of a suitable radial tire. The strip width should be from about 15 to about 30 percent of the width of the cured tire tread width, and preferably from about 20 to 25 percent of the cured tread width. If the strips are too narrow, they tend to leave unreinforced areas under the tread. If the strips were too wide, the tire would not be capable of being built in a cylindrical shape and then lifted or shaped to a final toroid shape and vulcanized. The strips, if too wide, would restrict the tire in the green, or uncured, state such that expanding the tire from cylindrical to toroidal shape would not be possible. In FIG. 2 there is shown cuts along a straight line formed by points A-D, B-F, and C-G. The cords are cut at a bias angle of from about 45 degrees to about 65 degrees, preferably from about 50 degrees to 58 degrees. The individual strips 32 and 34, as shown in FIG. 3, are spliced together to form a long continuous strip 36 as shown in FIG. 4. The long strip 36 is suitable to be applied to a tire.

In FIG. 5 there is shown a partially built tire 38 and strip 36 is being applied to the carcass of the tire to form the belt. The strips are wound onto the tire casing in overlapping relationship. The amount of overlap is critical to making a satisfactory tire. The overlap must be at least about 50 percent of the width of the strip. Preferably, the overlap width is greater than 75 percent of the width of the strip. The strip 36 is wound onto the carcass in one direction to form a layer, for example, from left to right, and then the strip 36 is turned over so as to make an equal but opposite cord angle and then the strip 36 is wound onto the tire in the other direction to form another layer, for example, from right to left. This crossing of the angles of the cords is what provides reinforcement.

When the tire is shaped and vulcanized, the strips will slide on each other and pull down into a much narrower strip. The change in width of the belt also causes the cord angle of the reinforcing cords to become smaller. An angle of 54 degrees in the green, or uncured state, can become about 20 degrees in the shaped and cured tire.

Because the strips are narrow and can change position while the tire is being shaped, the radial tire of this invention can be manufactured in one stage rather than the normal two stage manufacture. If full width belts were placed on a first stage radial carcass, the tire could not be shaped into the final tire configuration because the full width belts would be too restrictive. This is why a radial tire is normally built in two stages. The first stage being to build the carcass on a cylindrical drum and then expand said carcass into a shape resembling a finished tire where the belts and tread are applied. This second stage is unnecessary with this invention. Quite unexpectedly the tire of this invention can be shaped into its final shape for curing after having applied the discontinuous cord belt comprising narrow strips of reinforcement.

After the reinforcing strips 36 are wound onto the tire to form the belt, the tread rubber is applied. The tread may be applied as one extruded slab of rubber or may be wound onto the tire in much the same fashion as in the belt strips.

The tire is then ready for vulcanization in a metal mold. The method for vulcanization is that used in normal tire production and is well understood to those knowledgeable in the tire manufacturing art.

An alternate method of preparing a strip for use as a reinforcing belt is shown in FIG. 6. The strip of reinforcing fabric would be cut to a double width and then folded in half to make a narrow 2-ply strip 40 having reinforcing cords of one-ply extending in a direction opposite to the cords in the other ply.

Figure 7:
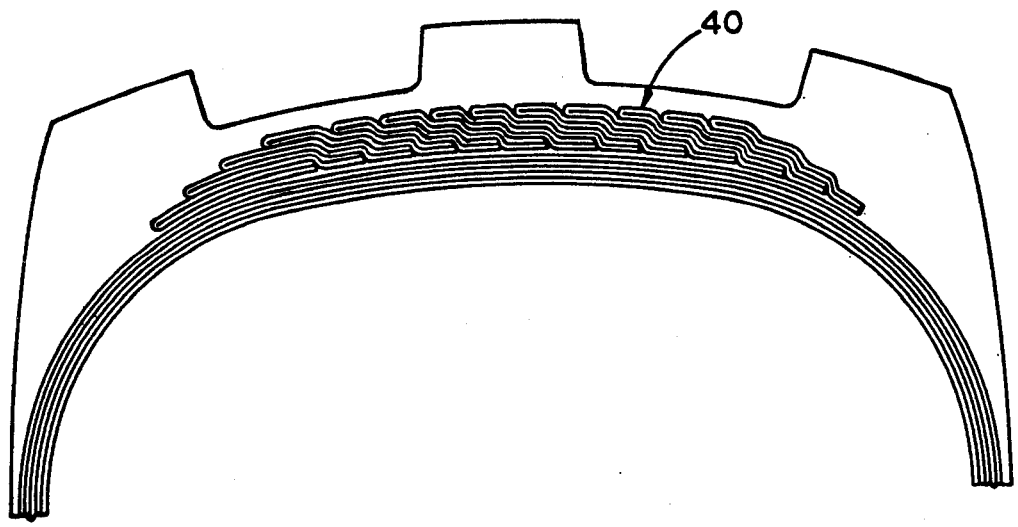
FIG. 7 is a fragmentary cross-sectional view of a shaped and vulcanized radial pneumatic tire having a discontinuous cord belt made with the folded strips of FIG. 6.

In FIG. 7 there is shown a tire which is similar to the tire of FIG. 1 except the folded strip 40 of FIG. 6 has been used to make the belt. Since the strip 40 is folded, the necessary reinforcement can be provided by winding a single pass of the folded strip onto a first-stage carcass. The folded strip 40 of FIG. 6 would offer certain advantages when building a large tire such as an off-the-road tire. Since the strip 40 is folded and therefore actually two plies, the application or winding time to put the strips on the tire would be much shorter.

A third method to prepare the strip for use as a reinforcing belt is shown in FIG. 8. The strip of reinforcing fabric would be cut to width and two or a multiple of two layers of strips are plied together with the cord angles of the layers alternating to form reinforcing strip 42.

Figure 9:
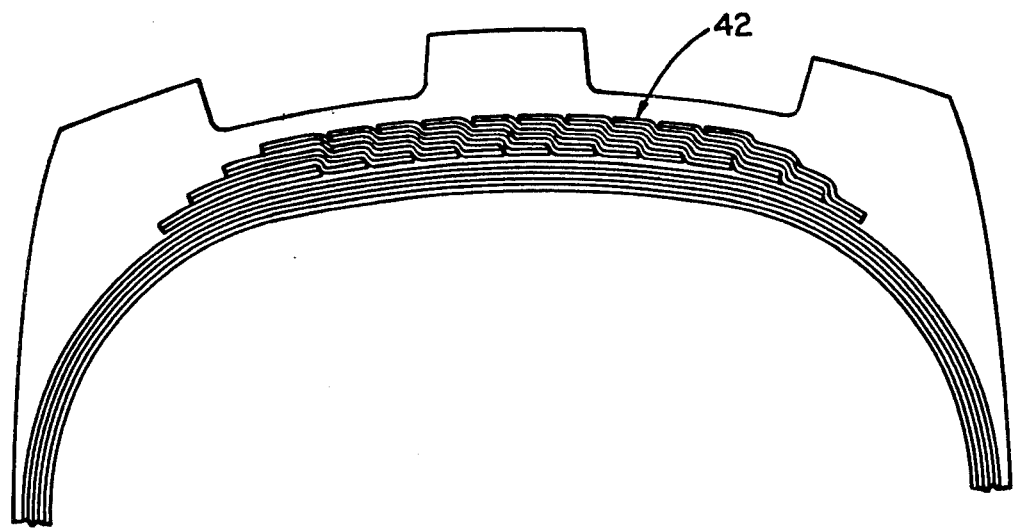
FIG. 9 is a fragmentary cross-sectional view of a shaped and vulcanized radial pneumatic tire having a discontinuous cord belt made with the strips of FIG. 8.

In FIG. 9 there is shown a tire which is similar to the tire of FIG. 1 except the multiple ply strip 42 of FIG. 8 has been used to make the reinforcing belt. The strip of FIG. 8 is similar to that of FIG. 6 in that since they both have cords alternating in angle there only need be one pass made in winding the strip onto the carcass to form the belt.

It has been determined that a single-ply strip with a two-pass winding (left to right and right to left) is preferred over the plied-up strip with single-pass winding for use on farm tires and smaller tires. The plied-up strip with single-pass winding has a tendency to give more non-uniform shoulder wear. For large tires such as off-the-road tires requiring large belt reinforcement, plied-up strips with a twopass winding are satisfactory.

This invention can be more clearly understood by way of the following example.

EXAMPLE

Four size 18.4 R 38 radial farm service rear tires were satisfactorily made according to this invention. The tires were completely built in one stage on a cylindrical drum similar to those used in building bias tires. A protective rubber layer was first applied to a cylindrical metal tire building drum. Three plies of rubber-coated nylon carcass fabric were then applied to the drum. The bead grommets were set and the carcass plies turned up around the beads. A fourth carcass ply was then applied and turned down under the bead grommets.

The strips used to form the discontinuous cord belt were cut from a roll of 60-inch wide rubbercoated rayon fabric. The strips were cut four inches wide on a bias angle of 54 degrees similar to what is shown in FIG. 2. The cut strips were then buttspliced together end-to-end as in FIG. 4 to make a long strip of belt fabric. The belt was formed by winding the strips onto the carcass as is shown in FIG. 5. The four-inch wide strips were wound onto the carcass such that each successive strip overlaps by 3 inches the previous strip. The belt strips were wound from shoulder to shoulder left to right and then the strip was turned over so as to reverse the cord angle, thereby providing reinforcement and a second layer applied right to left from shoulder to shoulder of the tire forming a belt configuration as shown in the tire on FIG. 1.

A rubber tread and sidewall were then applied to the tire on the building drum. The completed green (unvulcanized) tires were each removed from their building drum and placed in a mold and shaped into toroidal shape and vulcanized for 80 minutes at a mold temperature of 330° F. The cured tread width of the tire was 18 inches.

The completed tires were removed from the mold and evaluated for performance as radial farm service rear tires. They were sectioned and found to have a belt cord angle of 20 degrees which is a desirable one for radial tires. The lifting or shaping process had caused the cords in the narrow strips to shift angle such that the original green angle of 54° was 20 degrees in the cured tire.

Similar tires were made using belt strips having a width of two inches. These tires were unsatisfactory because the strips tended to gather in groups as the tire was being shaped thereby leaving gaps of unreinforced areas in the tread area of the tire.

To prevent gaps in the reinforcement of the tread area, the width of the strips used to form the belt should be greater than about 15 percent of the width of the cured tire tread.

In practicing this invention, those skilled in the art may make minor variations in the disclosed novel tire and method for building same without departing from the scope of this invention. Therefore, it is intended that the scope of this invention be limited only by the following claims.

We claim:

1. A method for producing in one stage a radial pneumatic tire comprising:
    (a) assembling upon a cylindrical drum a tire carcass including spaced bead cores and at least one ply of rubber-coated cords oriented substantially axially upon the drum;
    (b) applying externally of the carcass a belt wherein said belt is applied as a plurality of narrow strips of rubberized cords in overlapping relationship, wherein the strips are disposed such that the reinforcing cords of a portion of the number of the strips are at opposite acute angles relative to the circumferential centerline of the drum with respect to the reinforcing cords in the remainder of the strips; and wherein said strips have a width of from about 15 to about 30 percent of the width of the tire tread width as measured on the vulcanized tire and are applied with an overlap width of at least 50 percent of the strip width, and said strips each have parallel reinforcing cords running at a bias angle of from about 45 degrees to about 65 degrees relative to the circumferential centerline of the drum;
    (c) applying rubber externally of said belt and carcass to constitute the tread and sidewall portions of the completed tire;
    (d) removing the assembled materials as a cylindrical uncured tire from the building drum; and
    (e) shaping the uncured tire to a toroidal configuration and vulcanizing the shaped tire with heat and pressure.

2. A method of claim 1 wherein the belt strips are disposed such that the reinforcing cords of a radially innermost layer and a radially outermost layer are at opposite acute angles relative to the circumferential centerline of the drum.

3. A method of claim 1 wherein said strips each contain more than one ply and the cord angle of the plies are at opposite but equal angles relative to the circumferential centerline of the tire.

4. A method of claim 1 wherein the overlap width of said strips is at least 75 percent of the strip width.

5. A method of claim 4 wherein said strips each have parallel reinforcing cords running at a bias angle of from about 50 to about 60 degrees relative to the circumferential centerline of the drum.

* * * * *